UNITED STATES PATENT OFFICE.

THOMAS McK. WILSON, OF MOBERLY, MISSOURI.

IMPROVEMENT IN HOG-CHOLERA COMPOUNDS.

Specification forming part of Letters Patent No. 204,694, dated June 11, 1878; application filed November 20, 1877.

*To all whom it may concern:*

Be it known that I, THOMAS McK. WILSON, of Moberly, in the county of Randolph and State of Missouri, have invented certain new and useful Improvements in Compounds for Cure of Hog-Cholera; and I do hereby declare that the following is a full, clear, and exact description thereof, which will enable others skilled in the art to which it appertains to make and use the same.

My invention relates to a medical compound for the cure of hog-cholera; and consists of a compound of black antimony, copperas, sulphur, saltpeter, charcoal, wheat flour, common salt, and wood-ashes, prepared and used substantially as hereinafter set forth.

In compounding the medicine I take four (4) pounds of powdered black antimony, four (4) pounds of powdered copperas, four (4) pounds of flower of sulphur, one (1) pound of powdered saltpeter, three (3) pounds of powdered charcoal, and four (4) pounds of wheat flour.

These ingredients are all mixed thoroughly, and to them are added four (4) quarts of common salt and one (1) bushel of pure wood-ashes, and all are again thoroughly mixed together; and when thus prepared the compound is placed in a dry place, where the hogs can have constant access to it.

The above-named quantities make a compound sufficient to give to from ten (10) to fifteen (15) hogs.

The hogs while being thus treated must be sheltered from rain, snow, and cold winds.

I am aware of the patents to J. Shannon, April 9, 1872, and to Runyon, Hiller, and Morris, October 6, 1866, for hog-cholera compounds, containing all except two of the ingredients used in my compound, but in different proportions, and with numerous other ingredients not used by me; and I do not claim the ingredients as compounded by them; but What I do claim, and desire to secure by Letters Patent, is—

The hog-cholera compound of black antimony, copperas, flower of sulphur, saltpeter, charcoal, wheat flour, common salt, and wood-ashes, prepared and used substantially as described.

In testimony that I claim the foregoing as my own invention I affix my signature in presence of two witnesses.

THOMAS McK. WILSON.

Witnesses:
 J. B. DAVIS,
 JOHN B. SHERWOOD.